United States Patent
Bae

(10) Patent No.: US 9,762,293 B2
(45) Date of Patent: Sep. 12, 2017

(54) WIRELESS POWER REPEATER AND WIRELESS POWER TRANSMITTER

(75) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 707 days.

(21) Appl. No.: 14/347,156

(22) PCT Filed: Sep. 11, 2012

(86) PCT No.: PCT/KR2012/007298
§ 371 (c)(1),
(2), (4) Date: Mar. 25, 2014

(87) PCT Pub. No.: WO2013/048036
PCT Pub. Date: Apr. 4, 2013

(65) Prior Publication Data
US 2014/0225453 A1    Aug. 14, 2014

(30) Foreign Application Priority Data

Sep. 27, 2011    (KR) .................. 10-2011-0097770

(51) Int. Cl.
*H04B 5/00*    (2006.01)
*H02J 5/00*    (2016.01)
*H01F 38/14*    (2006.01)

(52) U.S. Cl.
CPC ............ *H04B 5/0037* (2013.01); *H02J 5/005* (2013.01); *H01F 38/14* (2013.01)

(58) Field of Classification Search
CPC ........ H04B 5/0037; H02J 5/005; B60L 11/18; B60L 11/182
See application file for complete search history.

(56) References Cited

U.S. PATENT DOCUMENTS

| | | |
|---|---|---|
| 2004/0130916 A1 | 7/2004 | Baarman |
| 2009/0284082 A1 | 11/2009 | Mohammadian |
| 2010/0277120 A1 | 11/2010 | Cook et al. |
| 2011/0080051 A1 | 4/2011 | Lee et al. |
| 2011/0127848 A1 | 6/2011 | Ryu et al. |
| 2011/0133569 A1 | 6/2011 | Cheon et al. |

(Continued)

FOREIGN PATENT DOCUMENTS

| | | |
|---|---|---|
| JP | 2011-151989 A | 8/2011 |
| KR | 10-2009-0122072 A | 11/2009 |

(Continued)

OTHER PUBLICATIONS

European Search Report dated Sep. 24, 2015 in European Application No. 12836128.4-1804.

(Continued)

*Primary Examiner* — Jeffrey Shin
(74) *Attorney, Agent, or Firm* — Saliwanchik, Lloyd & Eisenschenk

(57) ABSTRACT

Disclosed is a wireless power transmitter which transmits power to a wireless power receiver using resonance. The wireless power transmitter includes a repeating resonant unit and a power source transmitting AC power having a mutual-change resonant frequency, which results from a mutual inductance component between the wireless power receiver and the repeating resonant unit, to the repeating resonant unit.

18 Claims, 2 Drawing Sheets

(56) References Cited

U.S. PATENT DOCUMENTS

| | | | |
|---|---|---|---|
| 2011/0175456 A1 | 7/2011 | Kozakai et al. | |
| 2012/0306265 A1* | 12/2012 | Yamamoto | B60L 5/005 307/9.1 |
| 2013/0119930 A1* | 5/2013 | Sakoda | B60L 11/182 320/108 |

FOREIGN PATENT DOCUMENTS

| | | |
|---|---|---|
| KR | 10-2011-0009226 A | 1/2011 |
| KR | 10-2011-0026027 A | 3/2011 |
| KR | 10-2011-0037728 A | 4/2011 |
| WO | WO-2011/098888 A2 | 8/2011 |

OTHER PUBLICATIONS

International Search Report in International Application No. PCT/KR2012/007298, filed Sep. 11, 2012.

Office Action dated Nov. 26, 2012 in Korean Application No. 10-2011-0097770.

\* cited by examiner

[Fig. 1]
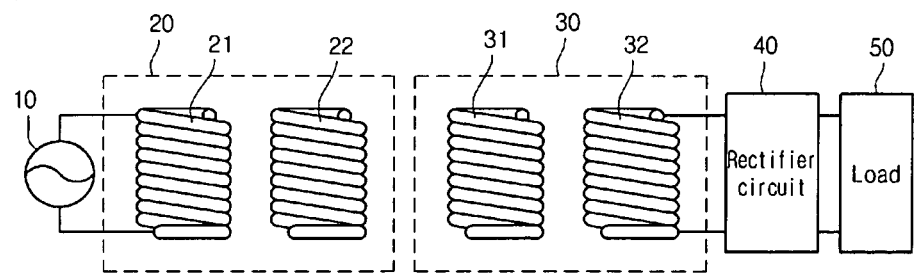
[Fig. 2]
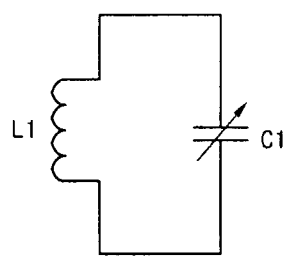
[Fig. 3]
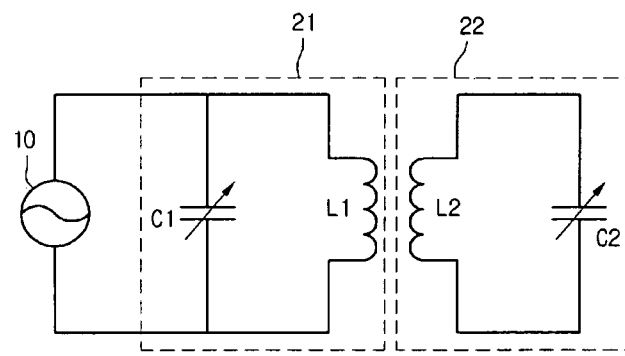
[Fig. 4]
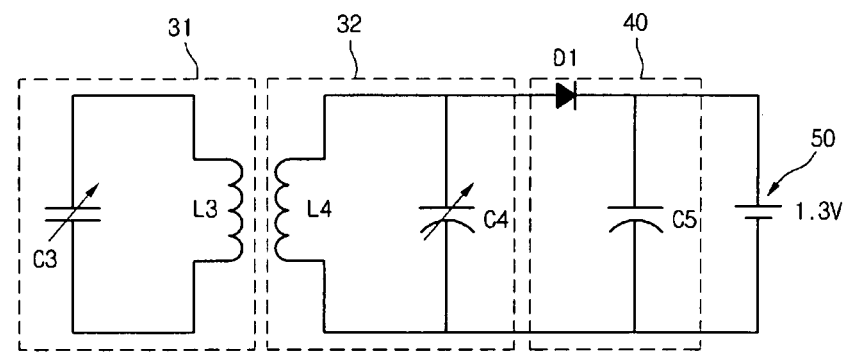

[Fig. 5]
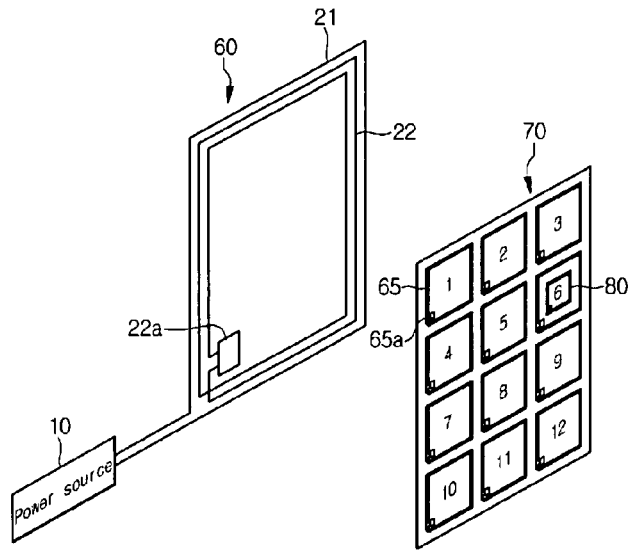
[Fig. 6]
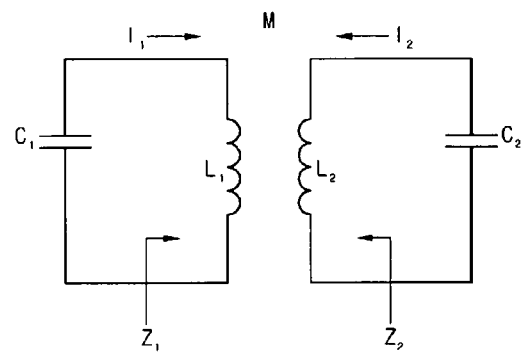
<Repeating resonator>    <Receiver>
[Fig. 7]
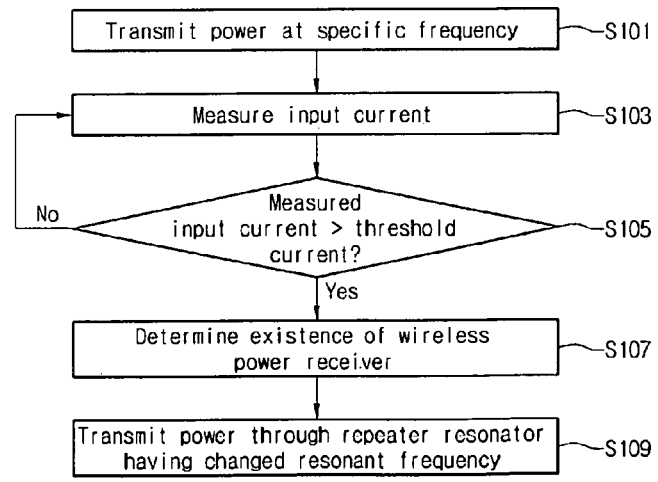

WIRELESS POWER REPEATER AND WIRELESS POWER TRANSMITTER

CROSS-REFERENCE TO RELATED APPLICATIONS

This application is the U.S. national stage application of International Patent Application No. PCT/KR2012/007298, filed Sep. 11, 2012, which claims priority to Korean Application No. 10-2011-0097770, filed Sep. 27, 2011, the disclosures of each of which are incorporated herein by reference in their entirety.

TECHNICAL FIELD

The disclosure relates to wireless power transmitting technology. In more particular, the disclosure relates to a wireless power repeater and a wireless power transmitter capable of effectively transmitting energy using resonance.

BACKGROUND ART

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

In the case of a short-distance wireless power transmission, which has been spotlighted in these days, a wireless power transmitter is installed in a building in such a manner that a mobile device, such as a cellular phone or a notebook computer, can be continuously charged when a user uses the mobile device in the building even if the mobile device is not connected to an additional power cable.

However, according to the wireless power transmission of the related art, power must be constantly transmitted or repeated regardless of the existence and location of the wireless power receiver that receives the power, causing the waste of the power and damage to the human body.

DISCLOSURE OF INVENTION

Technical Problem

The disclosure provides a wireless power repeater and a wireless power transmitter capable of transmitting energy using resonance.

In addition, the disclosure provides a wireless power repeater and a wireless power transmitter capable of transmitting energy through a specific repeating resonator corresponding to a location of a wireless power receiver.

Solution to Problem

According to the embodiment, there is provided a wireless power transmitter which wirelessly transmits power to a wireless power receiver using resonance The wireless power transmitter includes a repeating resonant unit and a power source transmitting AC power having a mutual-change resonant frequency, which results from a mutual inductance component between the wireless power receiver and the repeating resonant unit, to the repeating resonant unit.

According to the embodiment, there is provided a wireless power repeater which wirelessly transferring power to a wireless power receiver using resonance. The wireless power, repeater includes a plurality of repeating resonators, wherein the wireless power repeater transfers AC power having a mutual-change resonant frequency, which results from a mutual inductance component between a wireless power transmitter and the repeating resonators, to the wireless power receiver.

Advantageous Effects of Invention

According to the embodiment, the wireless power transmitter can transmit energy through the repeating resonator corresponding to a location of the wireless power receiver, so that energy transmission efficiency to the wireless power receiver may be improved.

In addition, the wireless power transmitter concentrates energy transmission through a specific repeating resonator, so that the waste of the power may be reduced and generation of a magnetic field harmful to the human body may be reduced.

Further, the wireless power transmitter transmits energy using a mutual-change resonant frequency generated due to the mutual inductance component between a specific repeater and the wireless power receiver, so the wireless power transmitter can be implemented with a simple circuit with an active transmission scheme at a low cost.

Meanwhile, other various effects may be directly or indirectly disclosed in the following description of the embodiment of the disclosure.

BRIEF DESCRIPTION OF DRAWINGS

FIG. 1 is a view illustrating a wireless power transmission system according to one embodiment;

FIG. 2 is a circuit diagram showing an equivalent circuit of a transmission coil unit according to one embodiment;

FIG. 3 is a circuit diagram showing an equivalent circuit of a power source and a transmitting unit according to one embodiment;

FIG. 4 is a circuit diagram showing an equivalent circuit of a reception resonant coil, a reception coil unit, a smoothing circuit, and a load according to one embodiment;

FIG. 5 is a view showing a configuration of a wireless power transmission system according to another embodiment;

FIG. 6 is a circuit diagram showing an equivalent circuit of a repeating resonator and a wireless power receiver for calculating a mutual-change resonant frequency; and FIG. 7 is a flowchart showing a power transmission method of a wireless power transmitter according to one embodiment

BEST MODE FOR CARRYING OUT THE INVENTION

In the following description, if detailed description about well-known functions or configurations may make the subject matter of the disclosure unclear, the detailed description will be omitted. In addition, terminologies to be described are defined based on functions of components according to the embodiment, and may have meanings varying according to the intentions of a user or an operator and customers. Accordingly, the terminologies should be defined based on the whole context throughout the present specification.

Hereinafter, the embodiment will be described with reference to accompanying drawings.

FIG. 1 is a view showing a wireless power transmission system according to the embodiment.

Referring to FIG. 1, the wireless power transmission system includes a power source 10, a power transmitting unit 20, a power receiving unit 30, a current-rectifier circuit 40 and a load 50.

The power generated from the power source 10 is provided to the power transmitting unit 20, such that the power transmitting unit 20 transmits the power using resonance to the power receiving unit 30, which is resonant with the power transmitting unit 20 and has the same resonant frequency value as that of the power transmitting unit 20. The power transferred to the power receiving unit 30 is transferred via the rectifier circuit 40 to the load 50. The load 50 may be a battery or a predetermined apparatus which needs power.

In detail, the power source 10 is an AC power source for supplying AC power of a predetermined frequency.

The power transmitting unit 20 includes a transmission coil unit 21 and a transmission resonant coil unit 22. The transmission coil unit 21 is connected to the power source 10, such that an AC current flows through the transmission coil unit 21. When an AC current flows through the transmission coil unit 21, an AC current is induced to the transmission resonant coil unit 22 physically spaced apart from the transmission coil unit 21 due to electromagnetic induction. The power transferred to the transmission resonant coil unit 22 is transmitted using resonance to the power receiving unit 30 which forms a resonance circuit with the power transmitting unit 20.

According to the power transmission using resonance, the power can be transmitted between two LC circuits which are impedance-matched with each other. The power transmission scheme using the resonance can transmit the power farther than the power transmission scheme using the electromagnetic induction with the higher power transmission efficiency.

The power receiving unit 30 includes a reception resonant coil unit 31 and a reception coil unit 32. The power transmitted from the transmission resonant coil unit 22 is received at the reception resonant coil unit 31, so that the AC current flows through the reception resonant coil unit 31. The power transmitted to the reception resonant coil unit 31 is transferred by electromagnetic induction to the reception coil unit 32. The power transferred to the reception coil 32 is transferred through the rectifier circuit 40 to the load 50.

FIG. 2 is an equivalent circuit diagram of the transmission coil unit 21 according to the embodiment. As shown in FIG. 2, the transmission coil unit 21 may include an inductor L1 and a capacitor C1, and form a circuit having a suitable inductance value and a suitable capacitance value.

The capacitor C1 may be a fixed capacitor or a variable capacitor. When the capacitor C1 is the variable capacitor, the power transmitting unit 20 may control the variable capacitor for an impedance matching. Meanwhile, equivalent circuits of the transmission resonant coil unit 22, the reception resonant coil unit 31, and the reception coil unit 32 may be equal to that depicted in FIG. 2.

FIG. 3 is an equivalent circuit diagram of the power source 10 and the power transmitting unit 20 according to the embodiment. As shown in FIG. 3, each of the transmission coil unit 21 and the transmission resonance coil part 22 may include an inductor L1 or L2 and a capacitor C1 or C2 having a predetermined inductance value and a predetermined capacitance value, respectively.

Especially, the capacitor C2 of the transmission resonant coil unit 22 may be a variable capacitor, and the power transmitting unit 20 may control the variable capacitor to control a resonant frequency value for resonance.

FIG. 4 is an equivalent circuit diagram of the reception resonant coil unit 31, the reception coil unit 32, the rectifier circuit 40 and the load 50 according to the embodiment. As shown in FIG. 4, each of the transmission resonant coil unit 31 and the reception coil part 32 may include an inductor L3 or L4 and a capacitor C3 or C4 having a predetermined inductance value and a predetermined capacitance value, respectively.

The rectifier circuit 40 may include a diode D1 and a rectifying capacitor C5 such that the rectifier circuit 40 converts AC power into DC power and outputs the DC power. Although the load 50 is denoted as a 1.3 V DC power source, the load 50 may be a battery or other devices requiring DC power.

Hereinafter, a wireless power transmitter and a method for transmitting energy through a specific repeating resonator corresponding to the location of the wireless power receiver according to the embodiment will be described.

FIG. 5 is a view showing a configuration of the wireless power transmission system according to another embodiment.

Referring to FIG. 5, the wireless power transmission system includes a wireless power transmitter 60, a repeating resonant unit 70 and a wireless power receiver 80. The present embodiment will be described on the assumption that the wireless power transmitter 60 transmits energy through the repeating resonant unit 70 to the wireless power receiver 80.

The wireless power transmitter 60 includes a power source 10, a transmission coil unit 21 and a transmission resonant coil unit 22. The wireless power transmitter 60 may transmit energy directly or through a specific repeating resonator to the wireless power receiver 80.

The power source 10 generates AC power having a specific frequency for energy transmission using resonance. That is, the power source 10 may generate the AC power having a mutual-change resonant frequency resulting from a mutual inductance component between the specific repeating resonator and the wireless power receiver and may supply the AC power to the wireless power transmitter 60.

The transmission coil unit 21 is connected to the power source 10 such that AC current may flow therethrough. When the AC current flows through the transmission coil unit 21, an AC current is induced by electromagnetic induction to the transmission resonant coil unit 22 physically spaced apart from the transmission coil unit 21. The power transmitted to the transmission resonant coil unit 22 is transferred using resonance to the wireless power receiver.

The transmission resonant coil unit 22 includes a capacitor 22a which is a fixed capacitor or a variable capacitor.

If the capacitor 22a of the transmission resonant coil unit 22 is a variable capacitor, the wireless power transmitter 60 may control a self-resonant frequency through the capacitor 22a.

The repeating resonant unit 70 performs a function of repeating the energy, which is transmitted from the transmission resonant coil unit 22 using resonance, to the wireless power receiver 80.

Preferably, a repeating resonator 65 in the repeating resonant unit 70 is larger than the reception resonance coil in the wireless power receiver 80. The reason is because a coupling coefficient, which is equal to a threshold value or above, must exist between resonant coils of a transmitting party and a receiving party for the purpose of effective wireless power transmission. Thus, the transmission efficiency of the energy transmission scheme using a plurality of repeating resonators 65 is improved as compared with a scheme of directly transmitting energy from the wireless power transmitter 60 to the wireless power receiver 80.

The repeating resonant unit 70 may include a plurality of repeating resonators 65 regularly arranged. At this time, the repeating resonators 65 may have the same size and the same shape. In addition, the repeating resonant unit 70 may be spaced apart from the wireless power transmitter by a predetermined distance.

Although it has been illustrated that twelve repeating resonators are arranged in the form of a lattice or a matrix, the embodiment is not limited thereto. In addition, although the repeating resonant unit 70 is provided in the form of a repeating pad having a rectangular shape, the embodiment is not limited thereto.

Each of the repeat resonators 65 may include the same capacitor 65a and the capacitor 65a may be a fixed capacitor. At this time, the repeating resonators 65 may have the same self-resonant frequency $f_1$.

If the wireless power receiver 80 is placed on the repeating resonant unit 70, the wireless power transmitter 60 transmits energy through a specific repeating resonator corresponding to the position of the wireless power receiver 80.

The wireless power receiver 80 may include a reception resonant coil unit, a reception coil unit, a rectifier circuit and a load. However, as shown in in FIG. 7, the wireless power receiver 80 is schematically illustrated with the reception resonant coil unit and the reception coil unit for the purpose of convenience of explanation.

The power transmitted from the transmission resonant coil unit 22 is received in the reception resonant coil unit 31 so that an AC current flows through the reception resonant coil unit 31. The power transmitted to the reception resonant coil unit 31 is transmitted by electromagnetic induction to the reception coil unit 32. The power transmitted to the reception coil unit 32 is rectified by the rectifier circuit 40 and transferred to the load 50.

The reception resonant coil unit of each wireless power receiver 80 may include a capacitor, which may be a fixed capacitor. At this time, the wireless power receivers 80 may have the same self-resonant frequency $f_2$. In addition, the wireless power receiver 80 may be designed to have the self-resonant frequency the same as that of the repeating resonant unit 70.

If the wireless power receiver 80 is placed on the repeating resonant unit 70, the wireless power transmitter 60 transmits energy through a specific repeating resonator corresponding to the position of the wireless power receiver 80. At this time, the wireless power transmitter 60 generates power having the mutual-change resonant frequency so that the energy can be transmitted through the specific repeating resonator corresponding to the position of the wireless power receiver 80.

The principle of energy transmission from the wireless power transmitter to the wireless power receiver through the specific repeating resonator is as follows.

If a wireless power receiver approaches a specific repeating resonator from among a plurality of repeating resonators, an inductor component L1 of the specific repeating resonator is coupled with an inductor component L2 of the wireless power receiver, so that a Mutual inductance component is generated. At this time, the mutual inductance component may be defined as following equation 1.

$$M = k\sqrt{L_1 L_2} \qquad \text{[Equation 1]}$$

wherein k is a coupling coefficient, $L_1$ is a self-inductance of the repeating resonator unit, and $L_2$ is a self-inductance of the wireless power receiver.

The mutual inductance component M generated between the specific repeating resonator and the wireless power receiver may change the self-resonant frequency of the specific repeating resonator or the wireless power receiver. Such a changed resonant frequency will be referred to as a mutual-change resonant frequency $f_3$.

The mutual inductance component generated between the specific repeating resonator and the wireless power receiver may vary depending on the distance and position between the specific repeating resonator and the wireless power receiver. According to the present embodiment, the mutual-change resonant frequency $f_3$ refers to the resonant frequency which is changed due to the mutual inductance components between the specific repeating resonator and the wireless power receiver when the wireless power receiver is placed directly on the specific repeating resonator.

FIG. 6 is a circuit diagram showing an equivalent circuit of the repeating resonator and the wireless power receiver for calculating the mutual-change resonant frequency.

Referring to FIG. 6, the self-resonant frequency $f_1$ of the specific repeating resonator may be defined as following equation 2.

$$f_1 = \frac{1}{2\pi\sqrt{L_1 C_1}} \qquad \text{[Equation 2]}$$

wherein $L_1$ is an inductance value of the repeating resonator and $C_1$ is a capacitance value of the repeating resonator.

The self-resonant frequency $f_2$ of the wireless power receiver may be defined as following equation 3.

$$f_2 = \frac{1}{2\pi\sqrt{L_2 C_2}} \qquad \text{[Equation 3]}$$

wherein $L_2$ is an inductance value of the wireless power receiver and $C_2$ is a capacitance value of the wireless power receiver.

In FIG. 6, input impedance $Z_1$ and $Z_2$ resulting from the mutual inductance components between the repeating resonator and the wireless power receiver may be defined as following equations 4 and 5.

$$Z_1 = j\omega L_1 + \frac{j\omega C_2 \omega^2 M^2}{1 - \omega^2 L_2 C_2} \qquad \text{[Equation 4]}$$

$$Z_2 = j\omega L_2 + \frac{j\omega C_1 \omega^2 M^2}{1 - \omega^2 L_1 C_1} \qquad \text{[Equation 5]}$$

Due to the mutual inductance components, the inductance component of the repeating resonator is changed from L1 to $L_1'$ as expressed in Equation 6. That is, the inductance component of the repeating resonator is equal to Equation 6.

$$L_1' = L_1 + \frac{C_2 \omega^2 M^2}{1 - \omega^2 L_2 C_2} \quad \text{[Equation 6]}$$

Due to the mutual inductance components, the mutual-change resonant frequency $f_3$ of the repeating resonator may be calculated as expressed in Equation 7.

$$\omega_3 = \frac{1}{\sqrt{L_1' C_1}} \quad \text{[Equation 7]}$$

$$L_1' C_1 = \frac{1}{\omega_3^2}$$

$$\left( L_1 + \frac{C_2 \omega_3^2 M^2}{1 - \omega_3^2 L_2 C_2} \right) C_1 = \frac{1}{\omega_3^2}$$

$$\omega_3 = \sqrt{\frac{\sqrt{(L_1 C_1 - L_2 C_2)^2 + 4 C_1 C_2 M^2} - L_1 C_1 - L_2 C_2}{2(C_1 C_2 M^2 - L_1 L_2 C_1 C_2)}}$$

$$f_3 = \frac{1}{2\pi} \sqrt{\frac{\sqrt{(L_1 C_1 - L_2 C_2)^2 + 4 C_1 C_2 M^2} - L_1 C_1 - L_2 C_2}{2(C_1 C_2 M^2 - L_1 L_2 C_1 C_2)}}$$

Meanwhile, in Equation 7, the mutual-change resonant frequency of the wireless power receiver may be calculated by changing $L_1$, $C_1$, $L_2$ and $C_2$ into $L_2$, $C_2$, $L_1$ and $C_1$, respectively, and the value of the mutual-change resonant frequency of the wireless power receiver is equal to the value of the mutual-change resonant frequency of the repeating resonator.

The wireless power transmitter 60 may previously store information about the mutual-change resonant frequency $f_3$. In addition, the wireless power transmitter 60 generates AC power having the mutual-change resonant frequency $f_3$ through the power source 10 and transmits the energy through the specific repeating resonator corresponding to the position of the wireless power receiver. That is, actually, the energy transmission may be carried out by using the mutual-change resonant frequency $f_3$ other than the self-resonant frequency.

For instance, as shown in FIG. 5, if the wireless power receiver 80 is positioned on the $6^{th}$ repeating resonator, the self-resonant frequency is changed into the mutual-change resonant frequency $f_3$ due to the mutual inductance component between the $6^{th}$ repeating resonator and the wireless power receiver 80.

If the wireless power transmitter 60 transmits the power having the mutual-change resonant frequency $f_3$ in the direction of the repeating resonant unit 70, only the $6^{th}$ repeating resonator of the repeating resonant unit 70 is resonant with the wireless power transmitter 60. Thus, the power is repeated to the wireless power receiver 80 positioned on the $6^{th}$ repeating resonator.

Since remaining repeating resonators of the repeating resonant unit 70 have the self-resonant frequency $f_1$, the remaining repeating resonators are not resonant with respect to the mutual-change resonant frequency $f_3$. Therefore, the wireless power transmitter 60 transmits relatively low power to the wireless power receiver 80 through the remaining repeating resonators.

Meanwhile, if the wireless power receiver is not positioned on the repeating resonant unit 70, all repeating resonators in the repeating resonant unit may not be resonant with respect to the mutual-change resonant frequency $f_3$. Thus, there is no energy transmission using resonance among the wireless power transmitter, the repeating resonant unit and the wireless power receiver.

As described above, the wireless power transmitter according to the embodiment transmits energy through the specific repeating resonator corresponding to the position of the wireless power receiver located on the repeating resonant unit, so the energy transmission efficiency to the wireless power receiver can be improved.

FIG. 7 is a flowchart illustrating the wireless power transmission method of the wireless power apparatus according to one embodiment.

Hereinafter, the wireless power transmission method of the wireless power transmitter 60 will be explained based on the description described with reference to FIGS. 5 and 6.

Referring to FIG. 8, the wireless power transmitter 60 operates at a specific frequency to wirelessly transmit the power to the repeating resonator 70 (S101). The specific frequency may refer to the frequency resulting from the mutual inductance between the repeating resonator 65 and the wireless power receiver 65. That is, in a state that the frequencies of the wireless power receiver 65 and the wireless power receiver 80 are fixed, if the wireless power receiver 80 is positioned on the specific repeating resonator 65, the resonant frequencies of the wireless power receiver 65 and the wireless power receiver 80 may be simultaneously changed.

For instance, referring to FIG. 5, it is assumed that the resonant frequency of the $6^{th}$ repeating resonator is 100 KHz and the resonant frequency of the wireless power receiver 80 is 120 KHz. Of course, the $1^{st}$ to $12^{th}$ repeating resonators have the same resonant frequency and the above numerical values of 100 KHz and 120 KHz are illustrative purpose only. If the wireless power receiver 80 is positioned on the $6^{th}$ repeating resonator 65, the resonant frequency of the $6^{th}$ repeating resonator 65 and the wireless power receiver 80 is changed to 110 KHz due to the mutual inductance component. The numerical value of 110 KHz is illustrative purpose only. That is, since the wireless power transmitter 60 has previously stored information about the resonant frequency to be changed, the wireless power transmitter 60 can be operated at the resonant frequency of 110 KHz.

Referring again to FIG. 7, the wireless power transmitter 60 measures input current (S103). The input current may be output from the power source 10 and input into the wireless power transmitter 60. The reason for measuring the input current by the wireless power transmitter 60 is to check the existence of the wireless power receiver 80. To this end, the wireless power transmitter 60 has a separate current sensor (not shown) to measure the input current output from the power source 10 and input into the wireless power transmitter 60.

The wireless power transmitter 60 checks whether the measured input current is higher than the threshold current (S105). According to one embodiment, the threshold current is a minimum current to determine the existence of the wireless power receiver 80.

If the measured input current is higher than the threshold current, the wireless power transmitter 60 determines that the wireless power receiver 80 is positioned on the repeating resonant unit 70 (S107). This process is required to allow the wireless power transmitter 60 to transmit a greater amount of power later as compared with an amount of power transmitted in step S101. At this time, the resonant frequency of the wireless power receiver 80 and the repeating resonator ($6^{th}$ repeating resonator) corresponding to the position of the wireless power receiver 80 is changed due to the mutual inductance component.

Then, the wireless power transmitter 60 transmits the power to the wireless power receiver 80 through the repeating resonator having the changed resonant frequency (S109). That is, in FIG. 5, all repeating resonators except for the 6$^{th}$ repeating resonator are operated at the resonant frequency of 100 KHz and the 6$^{th}$ repeating resonator is operated at the resonant frequency of 110 KHz, so the wireless power transmitter 60 can transmit a greater amount of power through resonance with the 6$^{th}$ repeating resonator. In addition, the 6$^{th}$ repeating resonator can transmit the power, which is received from the wireless power transmitter 60 using resonance, to the wireless power receiver 80.

As described above, according to the wireless power transmission scheme of the wireless power transmitter of the embodiment, the power transmission is performed only through the repeating resonator corresponding to the position of the wireless power receiver 80, so the power may be rarely transmitted to the repeating resonators, which do not correspond to the position of the wireless power receiver 80, thereby preventing waste of power and reducing the magnetic field harmful to the human body.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wireless power transmitter which wirelessly transmits power to a wireless power receiver using resonance, the wireless power transmitter comprising:
a repeating resonant unit; and
a power source transmitting, to the repeating resonant unit, AC power having a mutual-change resonant frequency,
wherein the mutual-change resonant frequency is varied according to a mutual inductance component between the wireless power receiver and the repeating resonant unit, and
wherein the repeating resonators are arranged in a form of a lattice or a matrix in a repeating pad.

2. The wireless power transmitter of claim 1, wherein the repeating resonant unit includes a plurality of repeating resonators and the power source transmits the AC power having the mutual-change resonant frequency, which results from the mutual inductance component between the wireless power receiver and a specific repeating resonator corresponding to a position of the wireless power receiver.

3. The wireless power transmitter of claim 2, wherein a resonant frequency of each repeating resonator is different from a resonant frequency of the wireless power receiver.

4. The wireless power transmitter of claim 2, wherein the mutual-change resonant frequency is determined based on inductance and capacitance of the specific repeating resonator corresponding to a position of the wireless power receiver, and inductance and capacitance of the wireless power receiver.

5. The wireless power transmitter of claim 2, wherein the mutual-change resonant frequency $f_3$ is expressed as a following equation:

$$f_3 = \frac{1}{2\pi}\sqrt{\frac{\sqrt{(L_1 C_1 - L_2 C_2)^2 + 4C_1 C_2 M^2} - L_1 C_1 - L_2 C_2}{2(C_1 C_2 M^2 - L_1 L_2 C_1 C_2)}},$$

wherein $L_1$ is an inductance value of the repeating resonator corresponding to the position of the wireless power receiver, $L_2$ is an inductance value of the wireless power receiver, $C_1$ is a capacitance value of the repeating resonator corresponding to the position of the wireless power receiver, and $C_2$ is a capacitance value of the wireless power receiver.

6. The wireless power transmitter of claim 2, wherein the mutual-change resonant frequency is variable depending on a relative position between the wireless power receiver and the repeating resonator corresponding to the position of the wireless power receiver.

7. The wireless power transmitter of claim 2, wherein the repeating resonator is larger than a reception resonance coil in the wireless power receiver.

8. The wireless power transmitter of claim 2, wherein each of the repeat resonators includes a same capacitor.

9. The wireless power transmitter of claim 1, wherein the repeating resonant unit is spaced apart from the wireless power transmitter by a predetermined distance.

10. The wireless power transmitter of claim 1, further comprising a transmitting unit that transmits the AC power, which is received from the power source, to the wireless power receiver using resonance.

11. The wireless power transmitter of claim 1, wherein the transmitting unit comprises:
a transmission coil unit receiving the AC power from the power source to generate a magnetic field; and
a transmission resonant coil unit transmitting power generated by the magnetic field to the repeating resonant unit using resonance,
wherein the transmission resonant coil unit is coupled with the transmission coil unit.

12. The wireless power transmitter of claim 1, wherein the wireless power transmitter previously stores information about frequencies to be changed.

13. A wireless power repeater which wirelessly transfers power to a wireless power receiver using resonance, the wireless power repeater comprising:
a plurality of repeating resonators,
wherein the wireless power repeater transfers AC power having a mutual-change resonant frequency, which results from a mutual inductance component between a wireless power transmitter and the repeating resonators, to the wireless power receiver, and
wherein the repeating resonators are arranged in a form of a lattice or a matrix in a repeating pad.

14. The wireless power repeater of claim 13, wherein a resonant frequency of each repeating resonator is different from a resonant frequency of the wireless power receiver.

15. The wireless power repeater of claim 13, wherein the mutual-change resonant frequency is determined based on inductance and capacitance of the specific repeating resonator corresponding to a position of the wireless power receiver, and inductance and capacitance of the wireless power receiver.

16. The wireless power repeater of claim 13, wherein the mutual-change resonant frequency $f_3$ is expressed as a following equation:

$$f_3 = \frac{1}{2\pi} \sqrt{\frac{\sqrt{(L_1 C_1 - L_2 C_2)^2 + 4 C_1 C_2 M^2} - L_1 C_1 - L_2 C_2}{2(C_1 C_2 M^2 - L_1 L_2 C_1 C_2)}},$$

wherein $L_1$ is an inductance value of the repeating resonator corresponding to the position of the wireless power receiver, $L_2$ is an inductance value of the wireless power receiver, $C_1$ is a capacitance value of the repeating resonator corresponding to the position of the wireless power receiver, and $C_2$ is a capacitance value of the wireless power receiver.

17. The wireless power repeater of claim 13, wherein the mutual-change resonant frequency is variable depending on a relative position between the wireless power receiver and the repeating resonator corresponding to the position of the wireless power receiver.

18. The wireless power transmitter of claim 11, wherein the transmission resonant coil unit includes a variable capacitor.

* * * * *